(12) United States Patent
Buttolo et al.

(10) Patent No.: US 10,483,678 B2
(45) Date of Patent: Nov. 19, 2019

(54) VEHICLE ELECTRICAL CONNECTOR

(71) Applicant: Ford Global Technologies, LLC, Dearborn, MI (US)

(72) Inventors: Pietro Buttolo, Dearborn Heights, MI (US); Stuart C. Salter, White Lake, MI (US); Christopher Anthony Danowski, Rochester, MI (US); Paul Kenneth Dellock, Northville, MI (US)

(73) Assignee: Ford Global Technologies, LLC, Detroit, MI (US)

( * ) Notice: Subject to any disclaimer, the term of this patent is extended or adjusted under 35 U.S.C. 154(b) by 478 days.

(21) Appl. No.: 15/472,781

(22) Filed: Mar. 29, 2017

(65) Prior Publication Data

US 2018/0287287 A1    Oct. 4, 2018

(51) Int. Cl.
| | | |
|---|---|---|
| *H01R 13/447* | (2006.01) | |
| *H01R 13/717* | (2006.01) | |
| *H01R 24/64* | (2011.01) | |
| *H02J 7/00* | (2006.01) | |
| *H01R 107/00* | (2006.01) | |

(52) U.S. Cl.
CPC ......... *H01R 13/447* (2013.01); *H01R 13/717* (2013.01); *H01R 24/64* (2013.01); *H02J 7/0045* (2013.01); *H02J 7/0047* (2013.01); *H01R 2107/00* (2013.01); *H01R 2201/26* (2013.01)

(58) Field of Classification Search
CPC .... H01R 13/447; H01R 13/717; H01R 24/64; H01R 2107/00; H01R 2201/26; H02J 7/0045; H02J 7/0047
See application file for complete search history.

(56) References Cited

U.S. PATENT DOCUMENTS

| | | | |
|---|---|---|---|
| 2,486,859 A | 11/1949 | Meijer et al. | |
| 5,053,930 A | 10/1991 | Benavides | |
| 5,434,013 A | 7/1995 | Fernandez | |
| 5,709,453 A | 1/1998 | Krent et al. | |
| 5,839,718 A | 11/1998 | Hase et al. | |
| 6,031,511 A | 2/2000 | DeLuca et al. | |
| 6,117,362 A | 9/2000 | Yen et al. | |
| 6,183,101 B1 * | 2/2001 | Chien | G04B 19/30 362/84 |
| 6,260,988 B1 | 7/2001 | Misawa et al. | |

(Continued)

FOREIGN PATENT DOCUMENTS

| | | |
|---|---|---|
| CN | 101337492 A | 1/2009 |
| CN | 201169230 Y | 2/2009 |

(Continued)

OTHER PUBLICATIONS

"Touch Sensors Design Guide" by ATMEL, 10620 D-AT42-04/09, Revised Apr. 2009, 72 pages, Copyrighted 2008-2009 Atmel corporation.

*Primary Examiner* — Mary Ellen Bowman
(74) *Attorney, Agent, or Firm* — Vichit Chea; Price Heneveld LLP (57) ABSTRACT

An electrical connector is provided herein. The electrical connector includes a base member disposed within an exterior panel on a vehicle. A port is disposed within a surface of the base member. A wireless transceiver disposed within the vehicle. A controller is configured to selectively activate the port based on a location of an electronic device in relation to the port.

14 Claims, 7 Drawing Sheets

(56) References Cited

U.S. PATENT DOCUMENTS

| | | |
|---|---|---|
| 6,294,990 B1 | 9/2001 | Knoll et al. |
| 6,419,854 B1 | 7/2002 | Yocom et al. |
| 6,494,490 B1 | 12/2002 | Trantoul |
| 6,577,073 B2 | 6/2003 | Shimizu et al. |
| 6,729,738 B2 | 5/2004 | Thompson et al. |
| 6,737,964 B2 | 5/2004 | Samman et al. |
| 6,773,129 B2 | 8/2004 | Anderson, Jr. et al. |
| 6,820,888 B1 | 11/2004 | Griffin |
| 6,851,840 B2 | 2/2005 | Ramamurthy et al. |
| 6,859,148 B2 | 2/2005 | Miller |
| 6,871,986 B2 | 3/2005 | Yamanaka et al. |
| 6,953,536 B2 | 10/2005 | Yen et al. |
| 6,984,146 B1 * | 1/2006 | Boudreau .......... H01R 13/629 439/488 |
| 6,990,922 B2 | 1/2006 | Ichikawa et al. |
| 7,015,893 B2 | 3/2006 | Li et al. |
| 7,161,472 B2 | 1/2007 | Strumolo et al. |
| 7,213,923 B2 | 5/2007 | Liu et al. |
| 7,216,997 B2 | 5/2007 | Anderson, Jr. |
| 7,249,869 B2 | 7/2007 | Takahashi et al. |
| 7,264,366 B2 | 9/2007 | Hulse |
| 7,264,367 B2 | 9/2007 | Hulse |
| 7,347,576 B2 | 3/2008 | Wang et al. |
| 7,354,182 B2 | 4/2008 | Bartels |
| 7,441,914 B2 | 10/2008 | Palmer et al. |
| 7,458,698 B2 | 12/2008 | Heathcock et al. |
| 7,501,749 B2 | 3/2009 | Takeda et al. |
| 7,575,349 B2 | 8/2009 | Bucher et al. |
| 7,635,212 B2 | 12/2009 | Seidler |
| 7,690,942 B2 * | 4/2010 | Berg .......... H01R 13/465 439/488 |
| 7,726,856 B2 | 6/2010 | Tsutsumi |
| 7,745,818 B2 | 6/2010 | Sofue et al. |
| 7,753,541 B2 | 7/2010 | Chen et al. |
| 7,834,548 B2 | 11/2010 | Jousse et al. |
| 7,862,220 B2 | 1/2011 | Cannon et al. |
| 7,876,205 B2 | 1/2011 | Catten et al. |
| 7,987,030 B2 | 7/2011 | Flores et al. |
| 8,016,465 B2 | 9/2011 | Egerer et al. |
| 8,022,818 B2 | 9/2011 | la Tendresse et al. |
| 8,044,415 B2 | 10/2011 | Messere et al. |
| 8,066,416 B2 | 11/2011 | Bucher |
| 8,071,988 B2 | 12/2011 | Lee et al. |
| 8,097,843 B2 | 1/2012 | Agrawal et al. |
| 8,103,414 B2 | 1/2012 | Boss et al. |
| 8,118,441 B2 | 2/2012 | Hessling |
| 8,120,236 B2 | 2/2012 | Auday et al. |
| 8,136,425 B2 | 3/2012 | Bostick |
| 8,163,201 B2 | 4/2012 | Agrawal et al. |
| 8,169,131 B2 | 5/2012 | Murazaki et al. |
| 8,178,852 B2 | 5/2012 | Kingsley et al. |
| 8,197,105 B2 | 6/2012 | Yang |
| 8,203,260 B2 | 6/2012 | Li et al. |
| 8,207,511 B2 | 6/2012 | Bortz et al. |
| 8,232,533 B2 | 7/2012 | Kingsley et al. |
| 8,247,761 B1 | 8/2012 | Agrawal et al. |
| 8,261,686 B2 | 9/2012 | Birman et al. |
| 8,286,378 B2 | 10/2012 | Martin et al. |
| 8,317,329 B2 | 11/2012 | Seder et al. |
| 8,317,359 B2 | 11/2012 | Harbers et al. |
| 8,408,765 B2 | 4/2013 | Kuhlman et al. |
| 8,408,766 B2 | 4/2013 | Wilson et al. |
| 8,415,642 B2 | 4/2013 | Kingsley et al. |
| 8,421,811 B2 | 4/2013 | Odland et al. |
| 8,459,832 B2 | 6/2013 | Kim |
| 8,466,438 B2 | 6/2013 | Lambert et al. |
| 8,519,359 B2 | 8/2013 | Kingsley et al. |
| 8,519,362 B2 | 8/2013 | Labrot et al. |
| 8,539,702 B2 | 9/2013 | Li et al. |
| 8,552,848 B2 | 10/2013 | Rao et al. |
| 8,606,430 B2 | 12/2013 | Seder et al. |
| 8,624,716 B2 | 1/2014 | Englander |
| 8,631,598 B2 | 1/2014 | Li et al. |
| 8,653,553 B2 | 2/2014 | Yamazaki et al. |
| 8,664,624 B2 | 3/2014 | Kingsley et al. |
| 8,683,722 B1 | 4/2014 | Cowan |
| 8,724,054 B2 | 5/2014 | Jones |
| 8,754,426 B2 | 6/2014 | Marx et al. |
| 8,773,012 B2 | 7/2014 | Ryu et al. |
| 8,846,184 B2 | 9/2014 | Agrawal et al. |
| 8,851,694 B2 | 10/2014 | Harada |
| 8,876,352 B2 | 11/2014 | Robbins et al. |
| 8,905,610 B2 | 12/2014 | Coleman et al. |
| 8,922,388 B2 | 12/2014 | Nykerk |
| 8,937,454 B2 | 1/2015 | Baarman et al. |
| 8,952,341 B2 | 2/2015 | Kingsley et al. |
| 8,963,705 B2 | 2/2015 | Miller et al. |
| 8,994,495 B2 | 3/2015 | Dassanayake et al. |
| 9,006,751 B2 | 4/2015 | Kleo et al. |
| 9,018,833 B2 | 4/2015 | Lowenthan et al. |
| 9,057,021 B2 | 6/2015 | Kingsley et al. |
| 9,059,378 B2 | 6/2015 | Verger et al. |
| 9,065,447 B2 | 6/2015 | Buttolo et al. |
| 9,067,530 B2 | 6/2015 | Bayersdorfer et al. |
| 9,187,034 B2 | 11/2015 | Tarahomi et al. |
| 9,194,168 B1 | 11/2015 | Lu et al. |
| 9,299,887 B2 | 3/2016 | Lowenthal et al. |
| 9,315,148 B2 | 4/2016 | Schwenke et al. |
| 9,442,888 B2 | 9/2016 | Stanfield et al. |
| 9,452,709 B2 | 9/2016 | Aburto Crespo |
| 9,568,659 B2 | 2/2017 | Verger et al. |
| 9,579,987 B2 | 2/2017 | Penilla et al. |
| 9,616,812 B2 | 4/2017 | Sawayanagi |
| 9,923,294 B1 * | 3/2018 | Maranville .......... B60R 16/02 |
| 2002/0159741 A1 | 10/2002 | Graves et al. |
| 2002/0163792 A1 | 11/2002 | Formoso |
| 2003/0167668 A1 | 9/2003 | Kuks et al. |
| 2003/0179548 A1 | 9/2003 | Becker et al. |
| 2004/0213088 A1 | 10/2004 | Fuwausa |
| 2005/0084229 A1 | 4/2005 | Babbitt et al. |
| 2005/0189795 A1 | 9/2005 | Roessler |
| 2006/0087826 A1 | 4/2006 | Anderson, Jr. |
| 2006/0097121 A1 | 5/2006 | Fugate |
| 2007/0030136 A1 | 2/2007 | Teshima et al. |
| 2007/0032319 A1 | 2/2007 | Tufte |
| 2007/0285938 A1 | 12/2007 | Palmer et al. |
| 2007/0297045 A1 | 12/2007 | Sakai et al. |
| 2008/0205075 A1 | 8/2008 | Hikmet et al. |
| 2008/0272699 A1 * | 11/2008 | Capenos .......... B60Q 1/0088 315/77 |
| 2009/0217970 A1 | 9/2009 | Zimmerman et al. |
| 2009/0219730 A1 | 9/2009 | Syfert et al. |
| 2009/0251920 A1 | 10/2009 | Kino et al. |
| 2009/0260562 A1 | 10/2009 | Folstad et al. |
| 2009/0262515 A1 | 10/2009 | Lee et al. |
| 2010/0102736 A1 | 4/2010 | Hessling |
| 2011/0012062 A1 | 1/2011 | Agrawal et al. |
| 2011/0265360 A1 | 11/2011 | Podd et al. |
| 2012/0001406 A1 | 1/2012 | Paxton et al. |
| 2012/0020101 A1 | 1/2012 | Pastrick et al. |
| 2012/0104954 A1 | 5/2012 | Huang |
| 2012/0139335 A1 * | 6/2012 | Holland .......... B60L 58/15 307/9.1 |
| 2012/0183677 A1 | 7/2012 | Agrawal et al. |
| 2012/0280528 A1 | 11/2012 | Dellock et al. |
| 2013/0009855 A1 | 1/2013 | Gally et al. |
| 2013/0050979 A1 | 2/2013 | Van De Ven et al. |
| 2013/0069384 A1 | 3/2013 | Miroshnichenko et al. |
| 2013/0092965 A1 | 4/2013 | Kijima et al. |
| 2013/0154821 A1 | 6/2013 | Miller et al. |
| 2013/0314034 A1 * | 11/2013 | Ang .......... H02J 7/1438 320/107 |
| 2013/0335994 A1 | 12/2013 | Mulder et al. |
| 2014/0003044 A1 | 1/2014 | Harbers et al. |
| 2014/0029281 A1 | 1/2014 | Suckling et al. |
| 2014/0065442 A1 | 3/2014 | Kingsley et al. |
| 2014/0103258 A1 | 4/2014 | Agrawal et al. |
| 2014/0211498 A1 | 7/2014 | Cannon et al. |
| 2014/0264396 A1 | 9/2014 | Lowenthal et al. |
| 2014/0266001 A1 | 9/2014 | Wilde |
| 2014/0266666 A1 | 9/2014 | Habibi |
| 2014/0288832 A1 | 9/2014 | Hoch et al. |
| 2014/0373898 A1 | 12/2014 | Rogers et al. |
| 2015/0046027 A1 | 2/2015 | Sura et al. |

(56) References Cited

U.S. PATENT DOCUMENTS

| | | | |
|---|---|---|---|
| 2015/0085488 A1 | 3/2015 | Grote, III et al. | |
| 2015/0109602 A1 | 4/2015 | Martin et al. | |
| 2015/0138789 A1 | 5/2015 | Singer et al. | |
| 2015/0251539 A1* | 9/2015 | Sura | B60L 1/20 136/251 |
| 2015/0267881 A1 | 9/2015 | Salter et al. | |
| 2015/0288208 A1 | 10/2015 | Ries et al. | |
| 2015/0307033 A1 | 10/2015 | Preisler et al. | |
| 2015/0324708 A1 | 11/2015 | Skipp et al. | |
| 2015/0325946 A1* | 11/2015 | Savage | H01R 13/5213 439/142 |
| 2015/0339928 A1 | 11/2015 | Ramanujam | |
| 2015/0346727 A1 | 12/2015 | Ramanujam | |
| 2015/0366036 A1 | 12/2015 | Luostarinen | |
| 2016/0016506 A1 | 1/2016 | Collins et al. | |
| 2016/0082880 A1 | 3/2016 | Co et al. | |
| 2016/0102819 A1 | 4/2016 | Misawa et al. | |
| 2016/0131327 A1 | 5/2016 | Moon et al. | |
| 2016/0214535 A1 | 7/2016 | Penilla et al. | |
| 2016/0236613 A1 | 8/2016 | Trier | |
| 2016/0240794 A1 | 8/2016 | Yamada et al. | |
| 2017/0158125 A1 | 6/2017 | Schuett et al. | |
| 2017/0213165 A1 | 7/2017 | Stauffer et al. | |
| 2017/0253179 A1 | 9/2017 | Kumada | |
| 2017/0282718 A1* | 10/2017 | Malek | B60L 1/00 |
| 2018/0126932 A1* | 5/2018 | Secord | B60R 16/03 |
| 2018/0273022 A1* | 9/2018 | Bell | B60L 53/60 |

FOREIGN PATENT DOCUMENTS

| | | |
|---|---|---|
| CN | 201193011 Y | 2/2009 |
| CN | 202357840 U | 8/2012 |
| CN | 203753248 U | 8/2014 |
| CN | 204127823 U | 1/2015 |
| CN | 104869728 A | 8/2015 |
| CN | 105303642 A | 2/2016 |
| DE | 4120677 A1 | 1/1992 |
| DE | 29708699 U1 | 7/1997 |
| DE | 10319396 A1 | 11/2004 |
| EP | 1793261 A1 | 6/2007 |
| EP | 2719580 A1 | 4/2014 |
| EP | 2778209 A1 | 9/2014 |
| JP | 2000052859 A | 2/2000 |
| JP | 2000159011 A | 6/2000 |
| JP | 2007238063 A | 9/2007 |
| KR | 20060026531 A | 3/2006 |
| WO | 2006047306 A1 | 5/2006 |
| WO | 2008093266 A1 | 8/2008 |
| WO | 2014068440 A1 | 5/2014 |
| WO | 2014161927 A1 | 10/2014 |

* cited by examiner

VEHICLE ELECTRICAL CONNECTOR

FIELD OF THE INVENTION

The present invention generally relates to vehicular electrical ports, and more particularly to vehicle electrical ports disposed on an exterior portion of the vehicle.

BACKGROUND OF THE INVENTION

Vehicular electrical ports are installed within vehicles to provide power to a variety of electrically powered devices. It is therefore desired to implement improved electrical ports for further assisting occupants of the vehicle.

SUMMARY OF THE INVENTION

According to one aspect of the present disclosure, an electrical connector is disclosed. The electrical connector includes a base member disposed on an exterior portion of a vehicle. A port is disposed within a surface of the base member. A wireless transceiver is disposed within the vehicle. A controller is configured to selectively activate the port based on an authentication of an electronic device.

According to another aspect of the present disclosure, an external vehicle electrical connector is disclosed. The electrical connector includes a base member disposed within an exterior panel on a vehicle. A port is disposed within a surface of the base member. A luminescent structure is on said electrical connector and configured to luminesce in response to receiving an excitation light. A controller is configured to selectively activate the port.

According to yet another aspect of the present disclosure, an electrical connector is disclosed. The electrical connector includes a base member and a port disposed within the base. The port is configured to output electrical power. A cover is configured to removably conceal the port. A proximity switch is configured to detect a position of the cover. A controller is configured to selectively activate the port.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 2:
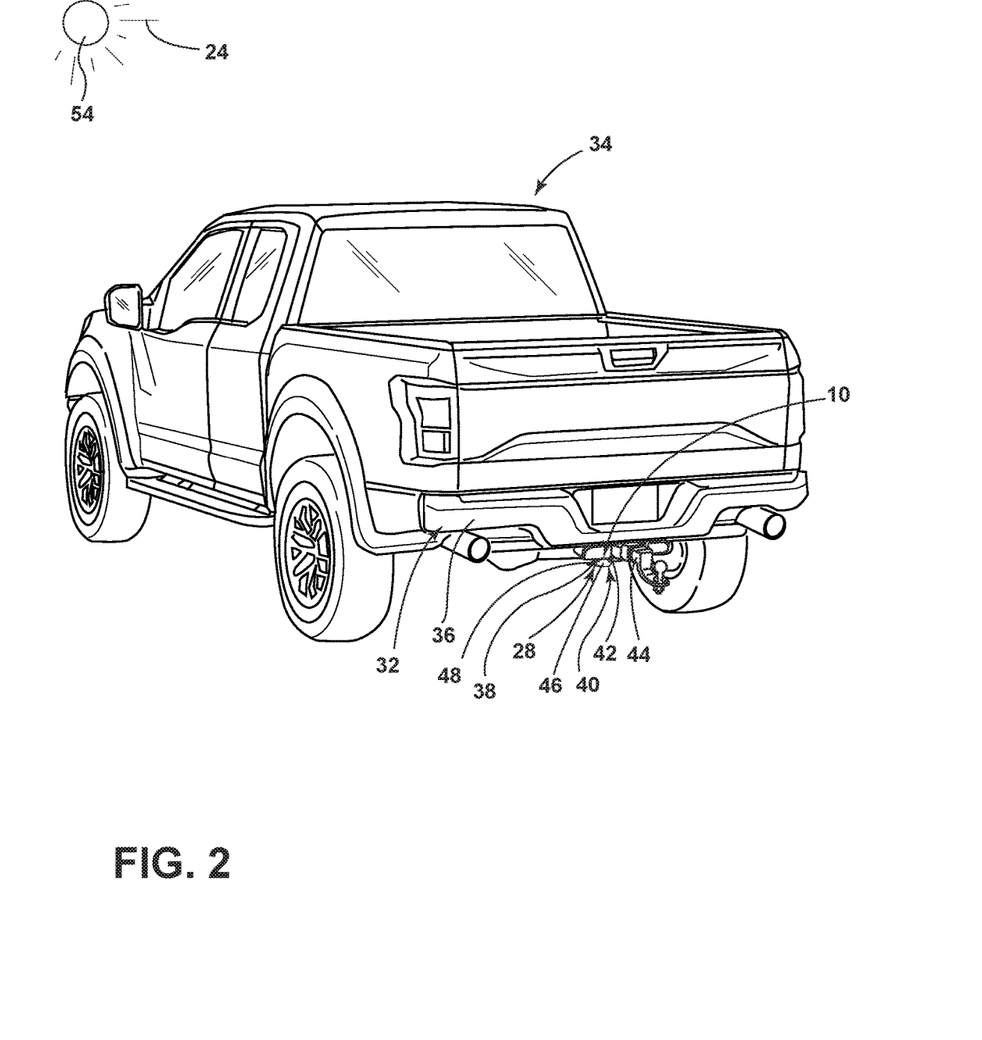
FIG. 2 is a rear perspective view of a vehicle employing an electrical connector that is proximate a hitch, according to various embodiments.

For purposes of description herein, the terms "upper," "lower," "right," "left," "rear," "front," "vertical," "horizontal," and derivatives thereof shall relate to the invention as oriented in FIG. 2. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure describes an electrical connector to provide electrical power to various areas of a vehicle. The electrical connector may include a wireless transceiver for usage of the electrical connector. The electrical connector may also employ one or more phosphorescent and/or luminescent structures to illuminate in response to predefined events. The one or more luminescent structures may be configured to convert excitation light received from an associated light source and re-emit the light at a different wavelength typically found in the visible spectrum.

Figure 1A:
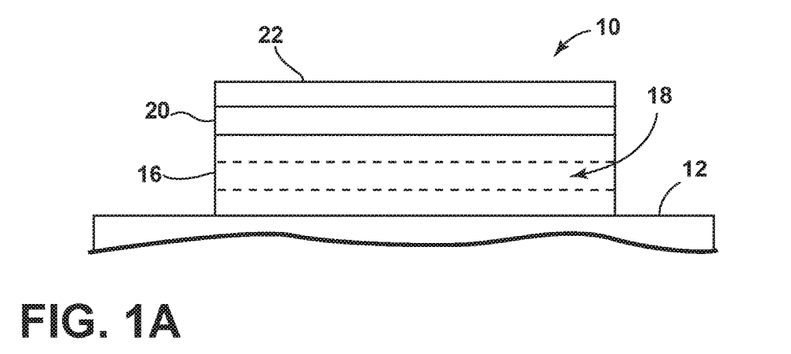
FIG. 1A is a side view of a luminescent structure rendered as a coating, according to various embodiments.
Figure 1B:
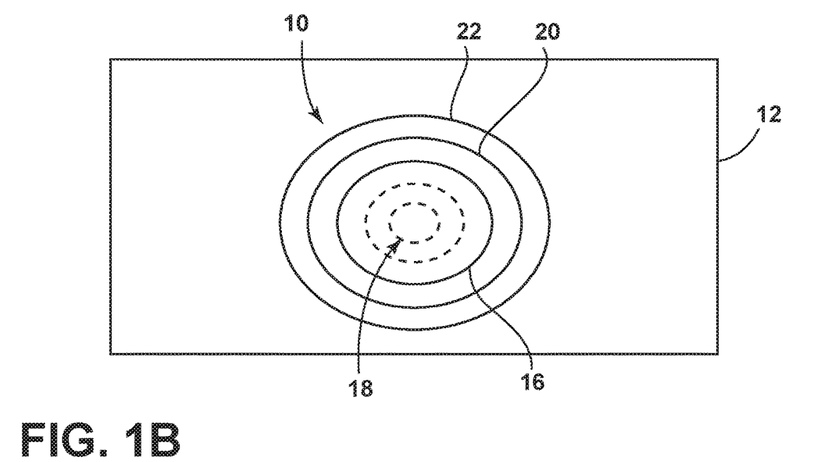
FIG. 1B is a top view of a luminescent structure rendered as a discrete particle, according to various embodiments.
Figure 1C:
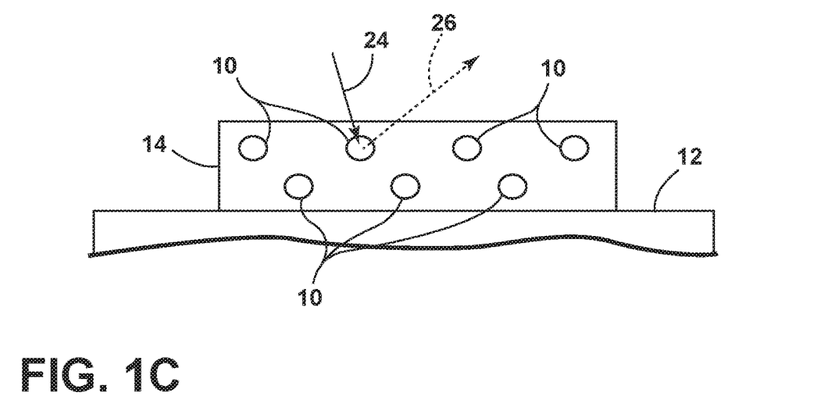
FIG. 1C is a side view of a plurality of luminescent structures rendered as discrete particles and incorporated into a separate structure.

Referring to FIGS. 1A-1C, various exemplary embodiments of luminescent structures 10 are shown, each capable of being coupled to a substrate 12, which may correspond to a vehicle fixture or vehicle-related piece of equipment. In FIG. 1A, the luminescent structure 10 is generally shown rendered as a coating (e.g., a film) that may be applied to a surface of the substrate 12. In FIG. 1B, the luminescent structure 10 is generally shown as a discrete particle capable of being integrated with a substrate 12. In FIG. 1C, the luminescent structure 10 is generally shown as a plurality of discrete particles that may be incorporated into a support medium 14 (e.g., a film) that may then be applied (as shown) or integrated with the substrate 12.

At the most basic level, a given luminescent structure 10 includes an energy conversion layer 16 that may include one or more sublayers, which are exemplarily shown in broken lines in FIGS. 1A and 1B. Each sublayer of the energy conversion layer 16 may include one or more luminescent materials 18 having energy converting elements with phosphorescent or fluorescent properties. Each luminescent material 18 may become excited upon receiving an excitation light 24 of a specific wavelength, thereby causing the light to undergo a conversion process. Under the principle of down conversion, the excitation light 24 is converted into a longer wavelength, converted light 26 that is outputted from the luminescent structure 10. Conversely, under the principle of up conversion, the excitation light 24 is converted into a shorter wavelength light that is outputted from the luminescent structure 10. When multiple distinct wavelengths of light are outputted from the luminescent structure 10 at the same time, the wavelengths of light may mix together and be expressed as a multicolor light.

Light emitted by a light source 52 (FIG. 3) may be referred to herein as excitation light 24 and is illustrated herein as solid arrows. In contrast, light emitted from the luminescent structure 10 may be referred to herein as converted light 26 and may be illustrated herein as broken arrows.

The energy conversion layer 16 may be prepared by dispersing the luminescent material 18 in a polymer matrix to form a homogenous mixture using a variety of methods. Such methods may include preparing the energy conversion layer 16 from a formulation in a liquid carrier support medium 14 and coating the energy conversion layer 16 to a desired substrate 12. The energy conversion layer 16 may be applied to a substrate 12 by painting, screen-printing, spraying, slot coating, dip coating, roller coating, and bar coating. Alternatively, the energy conversion layer 16 may be prepared by methods that do not use a liquid carrier support medium 14. For example, the energy conversion layer 16 may be rendered by dispersing the luminescent material 18 into a solid-state solution (homogenous mixture in a dry state) that may be incorporated in a polymer matrix, which may be formed by extrusion, injection molding, compression molding, calendaring, thermoforming, etc. The energy conversion layer 16 may then be integrated into a substrate 12 using any methods known to those skilled in the art. When the energy conversion layer 16 includes sublayers, each sublayer may be sequentially coated to form the energy conversion layer 16. Alternatively, the sublayers can be separately prepared and later laminated or embossed together to form the energy conversion layer 16. Alternatively still, the energy conversion layer 16 may be formed by coextruding the sublayers.

In various embodiments, the converted light 26 that has been down converted or up converted may be used to excite other luminescent material(s) 18 found in the energy conversion layer 16. The process of using the converted light 26 outputted from one luminescent material 18 to excite another, and so on, is generally known as an energy cascade and may serve as an alternative for achieving various color expressions. With respect to either conversion principle, the difference in wavelength between the excitation light 24 and the converted light 26 is known as the Stokes shift and serves as the principal driving mechanism for an energy conversion process corresponding to a change in wavelength of light. In the various embodiments discussed herein, each of the luminescent structures 10 may operate under either conversion principle.

Referring back to FIGS. 1A and 1B, the luminescent structure 10 may optionally include at least one stability layer 20 to protect the luminescent material 18 contained within the energy conversion layer 16 from photolytic and thermal degradation. The stability layer 20 may be configured as a separate layer optically coupled and adhered to the energy conversion layer 16. Alternatively, the stability layer 20 may be integrated with the energy conversion layer 16. The luminescent structure 10 may also optionally include a protective layer 22 optically coupled and adhered to the stability layer 20 or other layer (e.g., the conversion layer 16 in the absence of the stability layer 20) to protect the luminescent structure 10 from physical and chemical damage arising from environmental exposure. The stability layer 20 and/or the protective layer 22 may be combined with the energy conversion layer 16 through sequential coating or printing of each layer, sequential lamination or embossing, or any other suitable means.

Additional information regarding the construction of luminescent structures 10 is disclosed in U.S. Pat. No. 8,232,533 to Kingsley et al., the entire disclosure of which is incorporated herein by reference. For additional information regarding fabrication and utilization of luminescent materials to achieve various light emissions, refer to U.S. Pat. No. 8,207,511 to Bortz et al., U.S. Pat. No. 8,247,761 to Agrawal et al., U.S. Pat. No. 8,519,359 to Kingsley et al., U.S. Pat. No. 8,664,624 to Kingsley et al., U.S. Patent Publication No. 2012/0183677 to Agrawal et al., U.S. Pat. No. 9,057,021 to Kingsley et al., and U.S. Pat. No. 8,846,184 to Agrawal et al., all of which are incorporated herein by reference in their entirety.

According to various embodiments, the luminescent material 18 may include organic or inorganic fluorescent dyes including rylenes, xanthenes, porphyrins, and phthalocyanines. Additionally, or alternatively, the luminescent material 18 may include phosphors from the group of Ce-doped garnets such as YAG:Ce and may be a short-persistence luminescent material 18. For example, an emission by $Ce^{3+}$ is based on an electronic energy transition from $4D^1$ to $4f^1$ as a parity allowed transition. As a result of this, a difference in energy between the light absorption and the light emission by $Ce^{3+}$ is small, and the luminescent level of $Ce^{3+}$ has an ultra-short lifespan, or decay time, of $10^{-8}$ to $10^{-7}$ seconds (10 to 100 nanoseconds). The decay time may be defined as the time between the end of excitation from the excitation light 24 and the moment when the light intensity of the converted light 26 emitted from the luminescent structure 10 drops below a minimum visibility of 0.32 mcd/m². A visibility of 0.32 mcd/m² is roughly 100 times the sensitivity of the dark-adapted human eye, which corresponds to a base level of illumination commonly used by persons of ordinary skill in the art.

According to various embodiments, a $Ce^{3+}$ garnet may be utilized, which has a peak excitation spectrum that may reside in a shorter wavelength range than that of conventional YAG:Ce-type phosphors. Accordingly, $Ce^{3+}$ has short-persistence characteristics such that its decay time may be 100 milliseconds or less. Therefore, in various embodiments, the rare earth aluminum garnet type Ce phosphor may serve as the luminescent material 18 with ultra-short-persistence characteristics, which can emit the converted light 26 by absorbing purple to blue excitation light 24 emitted from the light source 52. According to various embodiments, a ZnS:Ag phosphor may be used to create a blue-converted light 26. A ZnS:Cu phosphor may be utilized to create a yellowish-green converted light 26. A $Y_2O_2S$:Eu phosphor may be used to create red converted light 26. Moreover, the aforementioned phosphorescent materials may be combined to form a wide range of colors, including white light. It will be understood that any short-persistence luminescent material known in the art may be utilized without departing from the teachings provided herein. Additional information regarding the production of short-persistence luminescent materials is disclosed in U.S. Pat. No. 8,163,201 to Agrawal et al., the entire disclosure of which is incorporated herein by reference.

Additionally, or alternatively, the luminescent material 18, according to various embodiments, disposed within the luminescent structure 10 may include a long-persistence luminescent material 18 that emits the converted light 26, once charged by the excitation light 24. The excitation light 24 may be emitted from any excitation source (e.g., any natural light source, such as the sun 54, and/or any artificial light source 52). The long-persistence luminescent material 18 may be defined as having a long decay time due to its ability to store the excitation light 24 and release the converted light 26 gradually, for a period of several minutes or hours, once the excitation light 24 is no longer present.

The long-persistence luminescent material 18, according to various embodiments, may be operable to emit light at or above an intensity of 0.32 mcd/m² after a period of 10 minutes. Additionally, the long-persistence luminescent material 18 may be operable to emit light above or at an intensity of 0.32 mcd/m² after a period of 30 minutes and, in various embodiments, for a period substantially longer than 60 minutes (e.g., the period may extend 24 hours or longer, and in some instances, the period may extend 48 hours). Accordingly, the long-persistence luminescent material 18 may continually illuminate in response to excitation from any light source 52 that emits the excitation light 24, including, but not limited to, natural light sources (e.g., the sun 54) and/or any artificial light source 52. The periodic absorption of the excitation light 24 from any excitation source may provide for a substantially sustained charge of the long-persistence luminescent material 18 to provide for consistent passive illumination. In various embodiments, a light sensor may monitor the illumination intensity of the luminescent structure 10 and actuate an excitation source when the illumination intensity falls below 0.32 mcd/m², or any other predefined intensity level.

The long-persistence luminescent material 18 may correspond to alkaline earth aluminates and silicates, for example, doped di-silicates, or any other compound that is capable of emitting light for a period of time once the excitation light 24 is no longer present. The long-persistence luminescent material 18 may be doped with one or more ions, which may correspond to rare earth elements, for example, Eu2+, Tb3+, and/or Dy3. According to one non-limiting exemplary embodiment, the luminescent structure 10 includes a phosphorescent material in the range of about 30% to about 55%, a liquid carrier medium in the range of about 25% to about 55%, a polymeric resin in the range of about 15% to about 35%, a stabilizing additive in the range of about 0.25% to about 20%, and performance-enhancing additives in the range of about 0% to about 5%, each based on the weight of the formulation.

The luminescent structure 10, according to various embodiments, may be a translucent white color, and in some instances reflective, when unilluminated. Once the luminescent structure 10 receives the excitation light 24 of a particular wavelength, the luminescent structure 10 may emit any color light (e.g., blue or red) therefrom at any desired brightness. According to various embodiments, a blue emitting phosphorescent material may have the structure $Li_2ZnGeO_4$ and may be prepared by a high-temperature solid-state reaction method or through any other practicable method and/or process. The afterglow may last for a duration of 2-8 hours and may originate from the excitation light 24 and d-d transitions of Mn2+ ions.

According to an alternate non-limiting exemplary embodiment, 100 parts of a commercial solvent-borne polyurethane, such as Mace resin 107-268, having 50% solids polyurethane in toluene/isopropanol, 125 parts of a blue-green long-persistence phosphor, such as Performance Indicator PI-BG20, and 12.5 parts of a dye solution containing 0.1% Lumogen Yellow F083 in dioxolane may be blended to yield a low rare earth mineral luminescent structure 10. It will be understood that the compositions provided herein are non-limiting examples. Thus, any phosphor known in the art may be utilized within the luminescent structure 10 without departing from the teachings provided herein. Moreover, it is contemplated that any long-persistence phosphor known in the art may also be utilized without departing from the teachings provided herein.

Additional information regarding the production of long-persistence luminescent materials is disclosed in U.S. Pat. No. 8,163,201 to Agrawal et al., the entire disclosure of which is incorporated herein by reference. For additional information regarding long-persistence phosphorescent structures, refer to U.S. Pat. No. 6,953,536 to Yen et al., U.S. Pat. No. 6,117,362 to Yen et al., and U.S. Pat. No. 8,952,341 to Kingsley et al., all of which are incorporated herein by reference in their entirety.

Referring to FIG. 2, an electrical connector 28 may include at least one port 30 (FIG. 3) and is disposed on an exterior portion 32 of a vehicle 34. The electrical connector 28 may additionally, and/or alternatively, be configured to provide electrical power through any other means known in the art that do not include a port 30, such as through inductive and/or conductive transmission.

As shown in FIG. 2, the electrical connector 28 may be located below a rear bumper 36 of the vehicle 34, which is generally depicted as a pickup truck, but may otherwise be configured as another vehicle type. As depicted in FIG. 2, a base member 38 of the electrical connector 28 may be disposed within a trailer hitch plug 40 that is exemplarily mounted to an undercarriage 42 of the vehicle 34 and is offset from a trailer hitch 44.

Figure 3:
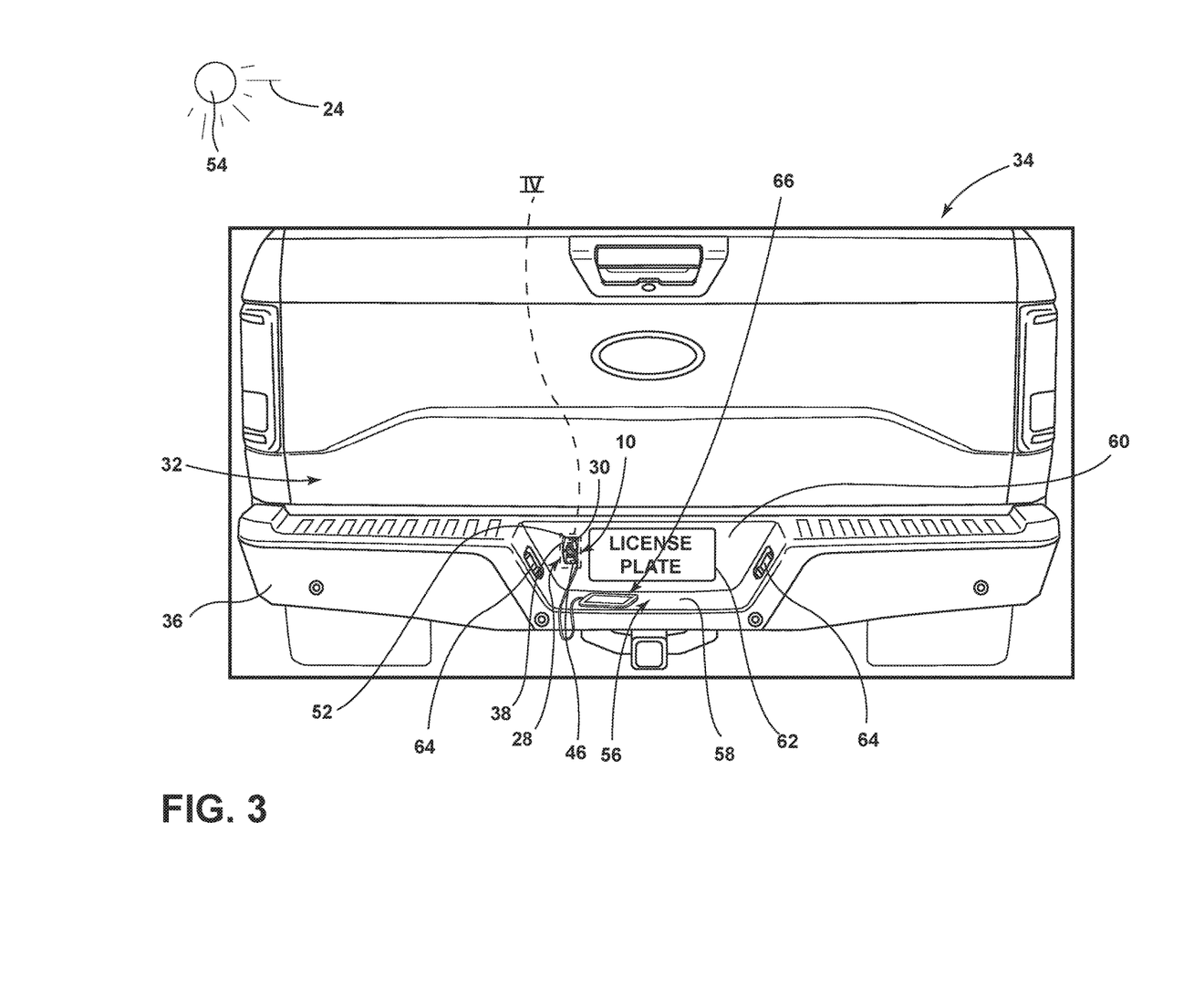
FIG. 3 is a rear perspective view of the electrical connector disposed within a license plate compartment, according to various embodiments.
Figure 4:
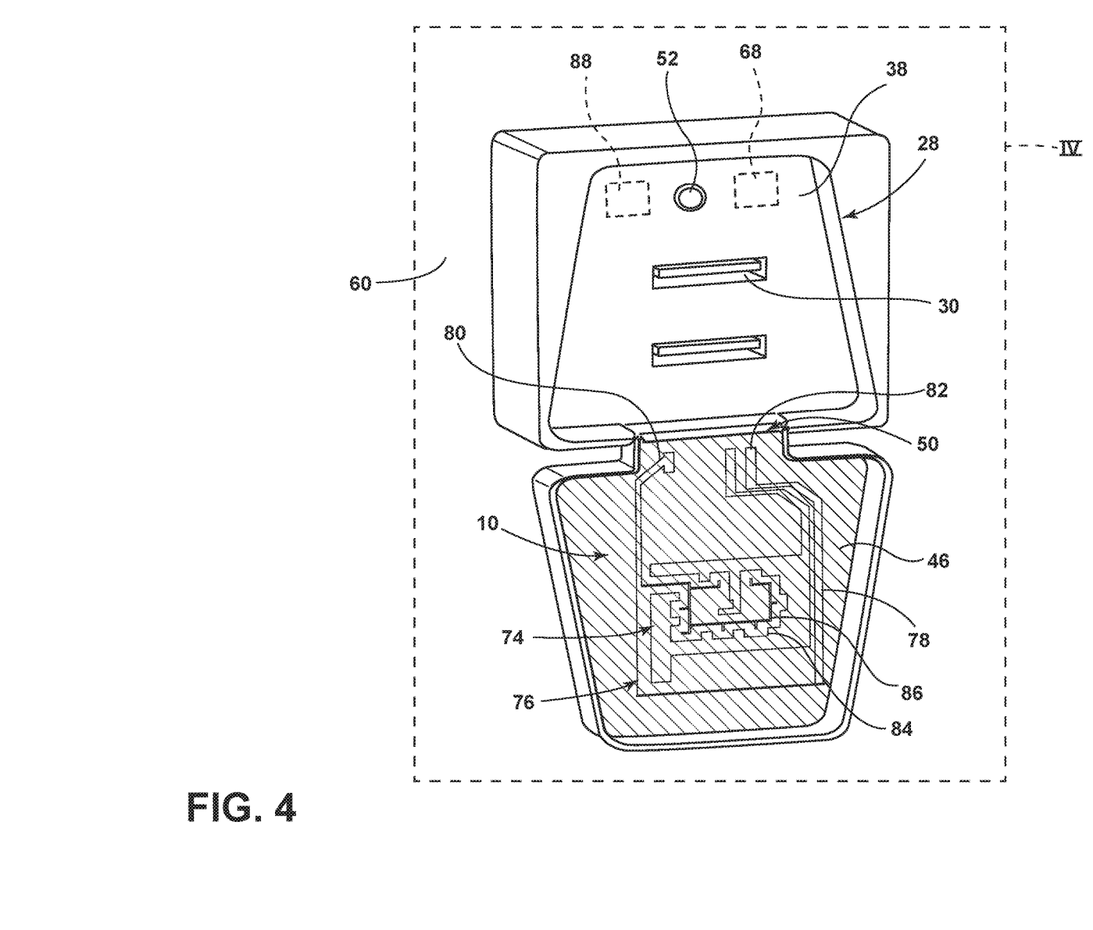
FIG. 4 is an enhanced view of the electrical connector of taken of the area IV of FIG. 3, according to various embodiments.

Referring still to FIGS. 2-4, the electrical connector 28 also includes a cover 46 that removably conceals the port 30 that may be disposed within a surface of the base member 38 of the electrical connector 28 via a tether 48 (FIG. 2) or a hinge 50 (FIG. 4). When covering the electrical port 30, the cover 46 generally seals the electrical port 30 and serves to protect the same from environmental elements. In some embodiments, the electrical connector 28 can be difficult to locate, especially in dark environments. Recognizing this problem, the electrical connector 28, according to the various embodiments described herein, is configured to illuminate to provide a visual indication of its whereabouts relative the vehicle 34. The illumination may be provided by a light source 52 integrated into the electrical connector 28 and/or the luminescent structure 10 disposed on a portion of the electrical connector 28 (e.g., the base member 38 and/or the cover 46).

According to various embodiments, the luminescent material 22 may be added during an injection molding process to the cover 46 thereby providing luminescent qualities to the cover 46. In operation, the cover 46 luminesces in response to excitation light 24 provided by a light source, which may include natural light from the sun 54, other light sources external to the vehicle 34, and/or light sources (e.g., the light source 52) disposed on the vehicle 34. In alternative embodiments, the cover 46 may be opaque and the luminescent material 22 may be applied to one or more exterior surfaces of the cover 46 via flexography or other known deposition processes. Additionally or alternatively, a luminescent material may be applied to or otherwise integrated with portions of the base member 38 that are visible to onlookers when the electrical connector 28 is mounted to the vehicle 34.

Referring to FIGS. 3 and 4, the electrical connector 28 is exemplarily located in a license plate compartment 56 provided at the rear of the vehicle 34. The license plate compartment 56 may be formed centrally in a rear bumper 36 of the vehicle 34 and is defined by an open channel 58 that terminates at a back wall 60 of the bumper 36. The electrical connector 28 is mounted to the back wall 60 and is offset from a license plate 62 that is mounted centrally to the back wall 60. Two lamps, configured as license plate lamps 64, are provided on each of the sidewalls of the channel 58 and are configured to illuminate the back wall 60, and particularly, the license plate 62. The luminescent structure 10 disposed on the electrical connector 28 is configured to luminesce in response to excitation light 24 provided the license plate lamps 64 and/or a natural light source such as excitation light 24 provided by the sun 54.

Referring still to FIGS. 3 and 4, an electronic device 66 is configured to couple, in a wired and/or wireless manner, to the electrical connector 28. The electronic device 66 may include a cellphone, a tablet, a key fob, wearable device (e.g., fitness band, watch, glasses, jewelry, wallet), apparel (e.g., a tee shirt, gloves, shoes or other accessories), personal digital assistant, headphones, speakers, flashlights, emergency situation equipment, Delivery Information Acquisition Device (DIAD), and/or other devices capable of wired and/or wireless transmission (e.g., radio frequency, Bluetooth, ultrasonic). According to various embodiments, the electrical connector 28 may be activated while a vehicle engine is operating and/or not operating, which may be deemed by the amount of power consumption needed by the electronic device 66.

Referring again to FIGS. 3 and 4, the electrical connector 28, or the vehicle 34, may further include one or more of the wireless communication transceivers 68 that may be configured to interact with the electronic device 66. The wireless communication transceivers 68 may communicate with the electronic device 66 over a wireless signal (e.g., radio frequency). In one non-limiting example, the wireless communication transceivers 68 may be a Bluetooth™ RN4020 module, or an RN4020 Bluetooth™ low energy PICtail board configured to communicate with the electronic device 66 using Bluetooth™ low energy signals. The wireless communication transceivers 68 may include a transmitter and a receiver to transmit and receive wireless signals (e.g., Bluetooth™ signals) to and from the electronic device 66. It will be appreciated that the wireless communication transceivers 68 may utilize other forms of wireless communication between the electronic device 66 and other wireless communication transceivers 68 such as Wi-Fi™.

In various embodiments, the wireless communication transceiver 68 is a stand-alone device that is not in communication with body control modules, electronic control modules, engine control modules and/or other features of the vehicle 34. For example, the wireless communication transceivers 68 may only be capable of communication with the electrical connector 28 and the electronic device 66. In other embodiments, the wireless communication transceivers 68 may communicate with a body controller and/or other onboard controllers. The vehicle 34 may include a plurality of wireless communication transceivers 68, similar to that described in connection with the electrical connector 28, positioned around the vehicle 34 (e.g., a rear, sides, or front of the vehicle 34). The wireless communication transceivers 68 may be in communication with one another or may mutually communicate with a master controller or module (e.g., body control module). The wireless communication transceivers 68 may be disposed within other accessories of the vehicle 34, or may be stand-alone units. The electronic device 66 may communicate with all, some, or none of the wireless communication transceivers 68 as the electronic device 66 enters and exits the communication range of the transceivers 68. Each of the wireless communication transceivers 68 may be aware of its location within the vehicle 34 and capable of sharing its location with the electronic device 66.

According to various embodiments, the port 30 is activated by authenticated electronic device 66. The authentication of the electronic device 66 may be determined based on whether the electronic device 66 has been inside of the vehicle 34 before. The memory of the wireless communication transceivers 68 may store identifying information relating to one another, when detected within the vehicle 34 and which may, therefore, be generally regarded as authenticated and/or as the owner of the vehicle 34.

In an exemplary method of determining that an unknown electronic device 66 is authenticated, the wireless communication transceivers 68 detect the presence of an unknown electronic device 66, detect a characteristic signal shift indicative of the unknown electronic device 66 entering or being within the vehicle 34, and store characteristic information about the electronic device 66 for future identification. It will be understood that a determination of the location of the electronic device 66 to be within the vehicle 34 may also prompt a storing of the characteristic information about the electronic device 66 for future identification. Utilizing the past and/or present location of the electronic device 66 as a security feature to determine if it is allowed access to the controller 128 (FIG. 9) may be particularly advantageous as the replication of signal shifting indicative of the electronic device 66 entering the vehicle 34 and the location of the electronic device 66 is particularly difficult to fake. Further, it will be understood that more conventional methods of connecting electronic devices 66, such as pairing and manually connecting, may also be utilized to designate authenticated electronic devices 66.

Once the electronic device 66 has been authenticated, an application on the electronic device 66 may assist in locating the electrical connector 28. The application may also detect the needed power consumption and alert a user of the electrical connector 28 whether the vehicle engine should be operating to reduce power draw on a stored energy source of the vehicle 34, such as a battery of the vehicle 34.

Referring still to FIGS. 3 and 4, the light source 52 may be integrated within the electrical connector 28 to provide the state of the electrical connector 28. The light source 52 may be configured to emit visible and/or non-visible light, such as blue light, ultraviolet (UV) light, infrared (IR) light, and/or violet light and may include any form of light source. For example, fluorescent lighting, light-emitting diodes (LEDs), organic LEDs (OLEDs), polymer LEDs (PLEDs), laser diodes, quantum dot LEDs (QD-LEDs), solid-state lighting, a hybrid of these or any other similar device, and/or any other form of lighting may be utilized within the electrical connector 28. Further, various types of LEDs are suitable for use as the light source 52 including, but not limited to, top-emitting LEDs, side-emitting LEDs, and others.

According to various embodiments, the light source 52 may be in a deactivated state while the electrical connector 28 is not being used. The light source 52 may become activated in response to scan requests from users looking to use the electrical connector 28, which may be detected by the wireless transceiver or the inputting of a cord within one of the ports 30. If the electrical port has authenticated the electronic device 66, or if the port 30 is set to an open access state, the light source 52 may illuminate in a first color (e.g., green). If the electrical connector 28 is in a locked state and the electronic device 66 has yet to be authenticated, the light source 52 may illuminate in a second color (e.g., yellow).

According to various embodiments, the electrical connector 28 may be removable from the vehicle 34. In such embodiments, the electrical connector 28 may be disposed in a locked state when removed from the vehicle 34. In such instances, when the electrical connector 28 is disposed within a second vehicle, the light source 52 may illuminate in a third color (e.g., red). Accordingly, the electrical connector 28 may be paired to the vehicle 34 to prevent theft of the electrical connector 28.

With further reference to FIGS. 3 and 4, the cover 46 may include an integrated proximity switch 74 that is configured to detect an open, closed, and/or intermediate position of the cover 46. The proximity switch 74 provides a sense activation field to sense contact or close proximity (e.g., within ten millimeters) of an object, such as a hand (e.g., palm or finger(s)) of an operator in relation to the proximity switch 74 and/or the base member 38 of the electrical connector 28. It will be appreciated by those skilled in the art that any type of proximity switch 74 can be used, such as, but not limited to, capacitive sensors, inductive sensors, optical sensors, temperature sensors, resistive sensors, the like, or a combination thereof. Exemplary proximity switches are described in the Apr. 9, 2009, ATMEL® Touch Sensors Design Guide, 10620 D-AT42-04/09, the entire reference is incorporated herein by reference. It will be appreciated that the switch 74 may alternatively be a mechanical switch of any type known in the art, such as a push button. In push button embodiments, a membrane may be provided as a seal over the switch 74. Depression of the membrane causes depression of a plunger on the switch 74. Internal switch contacts then change positions to provide an output signal.

Referring to FIGS. 3 and 4, the switch 74 is illustrated as a capacitive switch 76 that includes one or more capacitive sensors 78 and interconnecting electrical lead lines 80 and 82. The capacitive sensors 78 and electrical lead lines 80 and 82 may be formed of a printed conductive ink or indium tin oxide (ITO), which may be made of a visibly transparent ink, according to specific embodiments. The conductive elements of the capacitive sensors 78 and electrical lead lines 80 and 82 may be formed of copper such as flexible copper circuitry, according to another embodiment. The capacitive sensors 78 are formed of first and second electrodes each having electrode fingers 84, 86 that are generally aligned within the cover 46.

The electrical lead lines 80 and 82 connect to the electrodes of each capacitive sensor 78 to transmit and receive signals. The electrical lead line 80 is shown connecting to the drive electrode of the capacitive sensor 78. The electrical lead line 80 has an input at the bottom terminal end, which may connect to control circuitry that supplies a drive signal. The electrical lead line 82 includes respective lead lines that connect to respective receive electrodes of the capacitive sensor 78.

The capacitance of the sensor may vary according to various stimuli, e.g., contact or presence of a human (e.g., finger), physical contact (e.g., when the cover 46 closes), etc. In some embodiments, where the capacitive sensor is in an interior portion of the cover 46 when it is closed, a strip of material 88 may be added to the corresponding portion on the alternate face to ensure accurate sensing of a closing event. For example, when the cover 46 includes the capacitive sensor, the base member 38 may include material 88 at a position, such that when the cover 46 is closed, the capacitance of the capacitive sensor changes due to the presence of the material 88. In other words, when the cover 46 is closed, the capacitive sensor and the material 88 may be proximate to each other, meaning that the capacitive sensor has a different capacitance based on the presence of the material 88. The material 88 may be any type of substance or polymer, which affects the capacitive sensors in a predictable and unique (from other events occurring to the cover 46) manner. For example, in one embodiment, the material 88 may affect the capacitive sensor in such a way that it responds in a manner similar to human touch. In various embodiments, the material 88 may be a particular plastic or polymer, metal (composite, magnetic, or other type of metal), and/or other material.

After detection of lid closure, the electrical connector 28 may initiate a sequence of events based on the closure of the cover 46. For example, the electrical connector 28 may perform a sequence of events, which results in the electrical connector 28 entering a low power state and/or turning off the electrical port 30 of the electrical connector 28. If the vehicle engine begins to operate and/or the vehicle 34 begins to move while the cover 46 is in the open position or an electrical device is connected to the port 30, a notification may be provided by the vehicle 34.

Referring to FIGS. 5-8, the vehicle 34 is shown having a cargo box 90 and is equipped with a tailgate assembly 92 defining a rear wall of the cargo box 90, according to various embodiments. The cargo box 90 generally has a bottom floor 94, and lateral sidewalls 96 and 98, and a front wall (not shown). The tailgate assembly 92 defines the rear wall of the cargo box 90. The tailgate assembly 92 moves between an upright, vertical closed position generally shown in FIG. 5 to serve as the rear wall of the cargo box 90 and a downward, horizontal open position generally shown in FIG. 7.

The tailgate assembly 92 includes an interior side 100 that forms the rear wall of the cargo box 90, in some embodiments. An outer side 102 of the tailgate assembly 92 faces vehicle rearward when the tailgate assembly 92 is in the closed position. First and second lateral sides 104, 106 couple the interior and outer sides 100, 102 to one another. The interior side 100, the outer side 102, and the first and second lateral sides 104, 106 define a cavity 108 therebetween.

The tailgate assembly 92 extends between the sidewalls 96, 98 of the cargo box 90 and has a pair of hinge pivots 110 on opposite lateral sides 104, 106 of the tailgate assembly 92 near a bottom edge. The hinge pivots 110 may each include a hinge socket 112 and a pivot bracket 114 that allow the tailgate assembly 92 to pivot about the bottom edge relative to a supporting vehicle structure. The hinge pivots 110 may be keyed to allow removal of the tailgate assembly 92 from the vehicle 34.

The tailgate assembly 92 further includes a latch mechanism 116 located on opposite sides 104, 106 near the top edge configured to engage and latch onto rods 118 on the cargo box 90, such as the D-pillar, to retain the tailgate assembly 92 latched in the closed position. The latch mechanism 116 of the tailgate assembly 92 may employ conventional latching assemblies. The latch mechanism 116 may be controlled to open in response to actuation of a switch 120, which is shown built into a tailgate assembly release latch handle 122. In one embodiment, the switch 120 may be actuated by a user to unlatch the latch mechanism 116 to open the tailgate assembly 92. In one embodiment, the latch mechanism 116 may be electronically actuated to the unlatched position in response to actuation of the switch 120. However, it should be appreciated that the switch 120 and the latch mechanism 116 may be otherwise configured as mechanical user-actuated devices.

Figure 5:
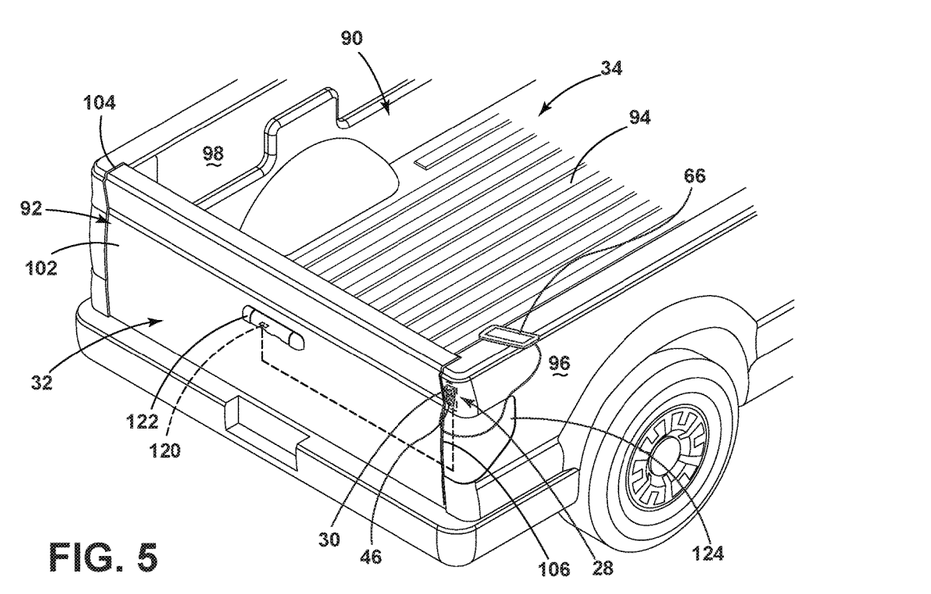
FIG. 5 is a rear perspective view of the vehicle having the electrical connector disposed proximately to a tail lamp assembly of the vehicle, according to various embodiments.
Figure 6:
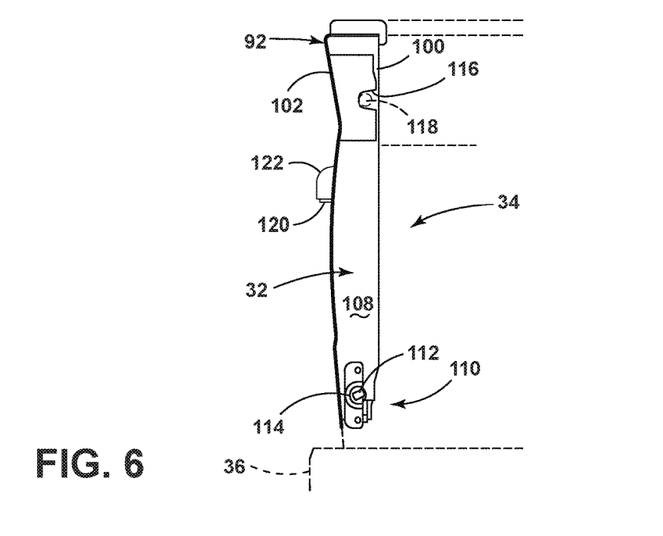
FIG. 6 is a side plan view of the tailgate assembly shown in FIG. 5 with the tailgate assembly in the closed position.

Referring to FIG. 5, the electrical connector 28 is disposed proximate to a rear tail lamp 124 of the vehicle 34. Accordingly, the electrical connector 28 may share common electrical connections with the tail lamp 124. Moreover, the rear tail lamp 124 may provide excitation light 24 that excites the luminescent structure 10 that may be disposed on the electrical connector 28, as provided herein.

Figure 7:
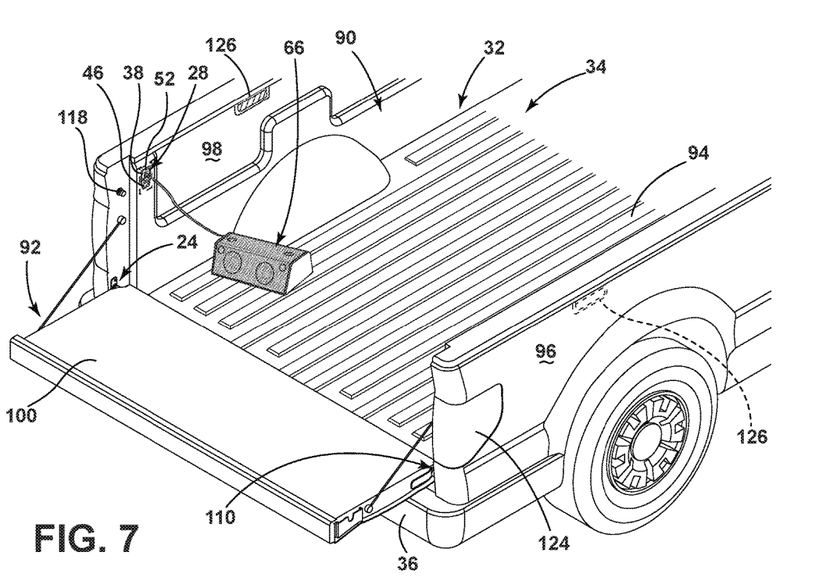
FIG. 7 is a rear side perspective view of the pickup truck cargo box with the tailgate assembly in a horizontal, open position and an electrical connector disposed on a lateral sidewall of a cargo box of the vehicle, according to one embodiment.

Referring to FIG. 7, the electrical connector 28 is disposed within the lateral wall of the cargo box. The electronic device 66 may be powered by the electrical port 30, such as a radio or speaker system. In additional embodiments, the electrical device may be in the form of a tool that is electrically powered. One or more cargo box lamps 126 may illuminate a portion of the cargo box and may additionally excite the luminescent structure 10 disposed on the electrical connector 28.

Figure 8:
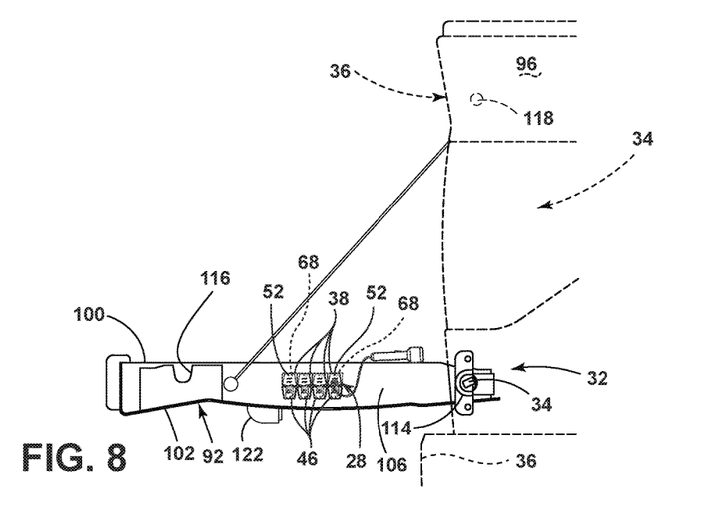
FIG. 8 is a side plan view of the tailgate assembly shown in FIG. 7 and an electrical connector disposed on a side portion of the tailgate assembly, according to one embodiment.

Referring to FIG. 8, the electrical connector 28 may be disposed on the side portion of the tailgate assembly. Accordingly, the electrical connector 28 may be concealed when the tailgate is in the closed position and accessible when the tailgate is in the open position. As illustrated in FIG. 8, the electrical connector 28 includes more than one port 30, such as eight ports, that may all be used simultaneously. According to various embodiments, the ports 30 may be used by large groups of users, such as emergency groups, to charge and/or power a wide range of devices. For example, the electrical connector 28 may power tools, such as flashlights, and communication devices simultaneously.

With further reference to FIG. 8, each pair of ports 30 includes an independent light source 52 that communicates the status of each respective electrical port 30. Moreover, each pair of ports 30 may include an independent cover 46, as shown in FIG. 8, or a single cover 46 may be used to cover all of the ports 30. Moreover, in various embodiments, the electrical ports 30 may be otherwise sealed from environmental contaminants such that a cover 46 is not needed. Additionally, each port 30 may have an independent light source 52 or cover 46 in various embodiments.

According to various embodiments, a large number of electronic devices 66 may be provided with an authentication key for usage of the ports 30 simultaneously. Accordingly, each device need not be independently authenticated prior to usage with the electrical connector 28. Additionally, the electronic device 66 may be placed in an open access state in which each device may utilize the available ports 30 without being authenticated.

Figure 9:
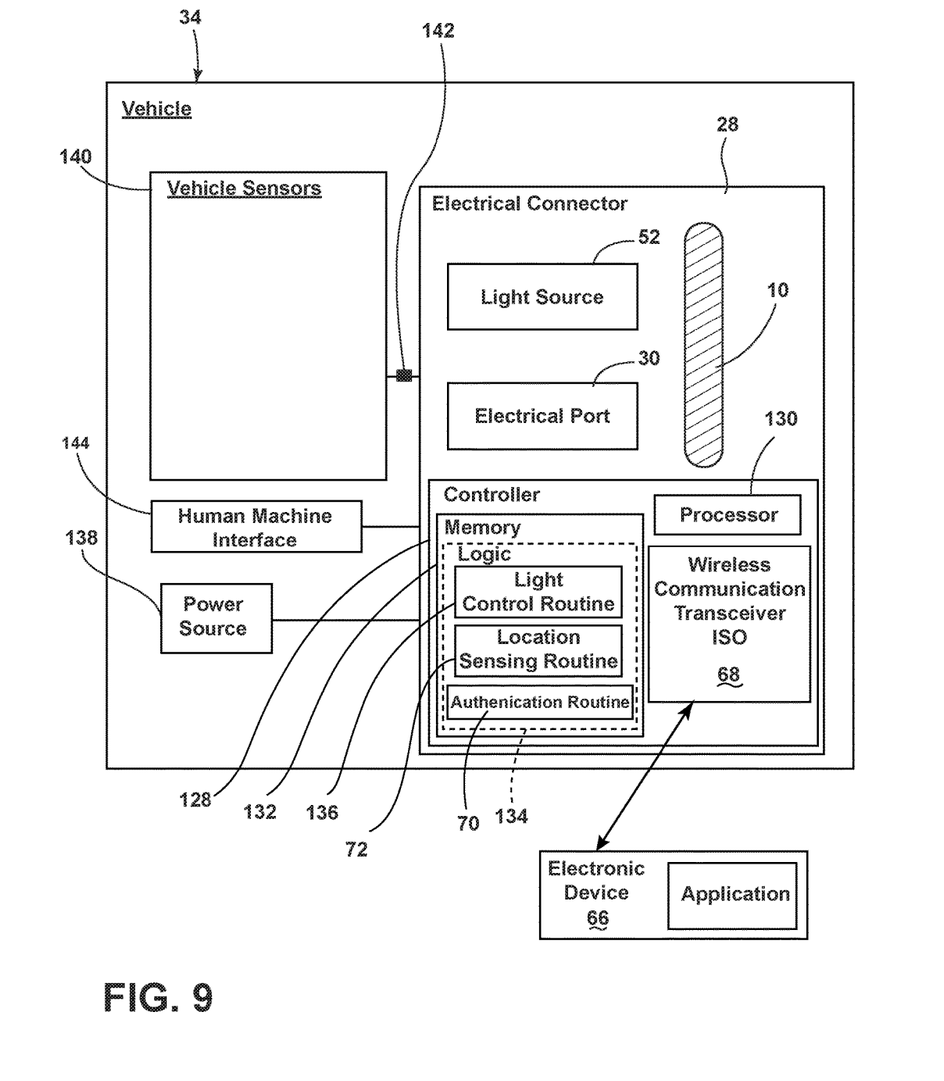
FIG. 9 is a block diagram of the vehicle incorporating the electrical connector, according to various embodiments.

Referring to FIG. 9, a block diagram of the vehicle 34 is shown in which the electrical connector 28 is positioned within the vehicle 34. A controller 128 within the electrical connector 28 and/or the vehicle 34 may include a processor 130 and memory 132 as illustrated, according to various embodiments. It should be appreciated that the controller 128 may include control circuitry such as analog and/or digital control circuitry. Logic 134 is stored in memory 132 and executed by the processor 130 for processing the various inputs and controlling the electrical connector 28, as described herein. The logic, according to various embodiments, includes a light control routine 136, the location sensing routine 72, and/or the authentication routine 70. A power source 138 is connected to the electrical connector 28 to provide power to the same. The electrical connector 28, and the vehicle 34, may also be equipped with one or more vehicle sensors 140 for detecting various actions of the vehicle 34 and activating the ports 30 based on the state of the vehicle 34. The one or more vehicle sensors 140 may communicate with the electrical connector 28 through a multiplex communication bus 142. The multiplex communication bus 142 may be disposed within the electrical connector 28 and/or the vehicle 34.

In various embodiments, the wireless communication transceivers 68 are capable of communicating with the electronic device 66 such that the location of the electronic device 66 may be determined therefrom (e.g., based on signal strength and/or return time of the signal) or vice versa. According to one embodiment, a location sensing routine 72 in the memory 132 of the controller 128 may utilize the signal strength and time to return of the signals between the plurality of wireless communication transceivers 68 and the electronic device 66 to triangulate the position of the electronic device 66 as the occupant moves around, inside, and/or outside of the vehicle 34. In embodiments where the wireless communication transceivers 68 communicate with a master module, the location of the electronic device 66 may be calculated in the master module. As provided herein, the location may be used to authenticate an electronic device 66.

The light control routine 136 may process signals from the wireless communication transceiver 68 (e.g., the location of the electronic device 66) to activate the electrical connector 28. Depending on the signals received from the wireless communication transceiver 68 and/or the vehicle sensors 140, the light control routine 136 may be activated. The light control routine 136 may store a predetermined illumination sequence for the light source 52 based on detected properties of the electronic device 66 (e.g., known or unknown device, location, and user specific data).

According to various embodiments, the electronic port 30 may be activated prior to usage of the same. Alternatively, a user may choose to have the port 30 in an open state such that the port 30 may be used by any electronic device 66 without authentication. In embodiments in which authentication is needed, the authentication of the electronic device 66 may be performed through a human machine interface (HMI) 144 (FIG. 9) within the vehicle 34. Once an electronic device 66 is authenticated, the device may be deemed "friendly," and may be powered by the port 30 for the lifespan of the electronic device 66. Additionally, as provided herein, the location sensing routine 72 may detect that the authenticated device is within a predefined distance of the vehicle 34 and, in response, activate the port 30.

With further reference to FIG. 9, the electrical connector 28, as provided herein, may also include the light source 52 and/or the luminescent structure 10. The light source 52 may notify a user of the electrical connector 28 of a status of the same. The luminescent structure 10 may be used to provide an emblem, logo, user information, and/or location of the electrical connector 28. In operation, the luminescent structure 10 may include a plurality of luminescent materials 18 therein that luminesce in response to receiving light of a specific wavelength. According to various embodiments, the luminescent structure 10 discussed herein is substantially Lambertian; that is, the apparent brightness of the luminescent structure 10 is substantially constant regardless of an observer's angle of view. As described herein, the color of the converted light 26 may be dependent on the particular luminescent materials 18 utilized in the luminescent structure 10. Additionally, a conversion capacity of the luminescent structure 10 may be dependent on a concentration of the luminescent material 18 utilized in the luminescent structure 10. By adjusting the range of intensities that may excite the luminescent structure 10, the concentration, types, and proportions of the luminescent materials 18 in the luminescent structure 10 discussed herein may be operable to generate a range of color hues of the excitation light 24 by blending the first wavelength with the second wavelength.

Detection of the location of the electronic device 66 relative to the vehicle 34 also permits the wireless communication transceivers 68 to determine if an unrecognized electronic device 66 is proximate the vehicle 34. Such an unrecognized electronic device 66 may be owned or carried by a potential burglar or threat to the vehicle 34.

In events where an unrecognized electronic device 66 is detected proximate the vehicle 34 for greater than a predetermined time, the wireless communication transceivers 68 may activate one or more countermeasures. Countermeasures may include a strobe light from the vehicle 34 or directing light from the electronic device 66. In some embodiments, any available identifying information about the electronic device 66 may be stored for later retrieval if the owner of the vehicle's electronic device 66 is not detected proximate the vehicle 34 at the same time. The wireless communication transceivers 68 may store more than fifty electronic devices 66 that may have been a threat. Finally, the use of the electrical connector 28 on the vehicle 34 may allow for a plurality of lighting solutions to be provided for the reversing or backing up of the vehicle 34. For example, the shifting of the vehicle 34 into a reverse gear may cause activation of the electrical connector 28 to provide greater illumination for the driver or for a backup camera of the vehicle 34.

A variety of advantages may be derived from the use of the present disclosure. For example, use of the electrical connector disclosed herein provides additional features to users of the vehicle. The electrical connector may be activated and used by predetermined users and/or devices. Moreover, the electrical connector disclosed herein provides notifications of the status of the port and may illuminate to assist in locating the electrical connector. The illumination of the electrical connector may be manufactured at low costs when compared to standard vehicle light assemblies.

According to various embodiments, an electrical connector is provided herein. The electrical connector includes a base member disposed within an exterior panel on a vehicle. A port is disposed within a surface of the base member. A wireless transceiver disposed within the vehicle. A controller is configured to selectively activate the port based on a location of an electronic device in relation to the port. The electrical connector may be configured as a vehicle exterior electrical connector. Embodiments of the electrical connector can include any one or a combination of the following features:

- a light source disposed on the base member and configured to provide notification of a status of the port;
- the controller associated with the wireless communication transceiver is configured to store information about one or more authenticated electronic devices;
- a cover configured to removably conceal the port; and a proximity switch configured to detect a position of the cover;
- the light source illuminates in a first color when a non-authenticated electronic device is coupled to the port and a second color when an authenticated device is coupled to the port;
- the port is a power supply connector;
- the port is a universal serial bus;
- a luminescent structure on said electrical connector and configured to luminesce in response to receiving an excitation light;
- the base member is disposed within a trailer hitch plug;
- the base member is disposed on a side portion of a vehicle tailgate, wherein the port is non-accessible when the tailgate is in a first position and is accessible when the tailgate is in a second position; and/or
- the controller activates the port when an electronic device is authenticated within the vehicle.

Moreover, the electrical connector may be manufactured by forming a base member; disposing the base member on an exterior portion of a vehicle; forming a port within a surface of the base member; coupling a wireless transceiver within the vehicle with the port; and operably coupling a controller to the port, the controller selectively activating the port based on an authentication of an electronic device.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

Furthermore, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited to, physically mateable and/or physically interacting components and/or wirelessly interactable and/or wirelessly interacting components and/or logically interacting and/or logically interactable components.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. An electrical connector, comprising:
   a base member disposed on an exterior portion of a vehicle;
   a port disposed within a surface of the base member;
   a wireless transceiver disposed within the vehicle; and
   a controller configured to selectively activate the port based on an authentication of an electronic device, wherein the controller activates the port when the electronic device is authenticated within the vehicle and further wherein the controller is associated with the wireless transceiver and is configured to store information about one or more authenticated electronic devices.

2. The electrical connector of claim 1, further comprising:
   a cover configured to removably conceal the port; and
   a proximity switch configured to detect a position of the cover.

3. The electrical connector of claim 1, further comprising:
   a light source disposed on the base member and configured to provide notification of a status of the port.

4. The electrical connector of claim 1, wherein the port is a power supply connector.

5. The electrical connector of claim 1, wherein the port is a universal serial bus.

6. The electrical connector of claim 1, further comprising:
   a luminescent structure on said electrical connector and configured to luminesce in response to receiving an excitation light.

7. The electrical connector of claim 6, wherein the base member is disposed within a trailer hitch plug.

8. The electrical connector of claim 1, wherein the base member is disposed on a side portion of a vehicle tailgate, wherein the port is non-accessible when the tailgate is in a first position and is accessible when the tailgate is in a second position.

9. An external vehicle electrical connector, comprising:
   a base member disposed within an exterior panel on a vehicle;
   a port disposed within a surface of the base member;
   a luminescent structure on said electrical connector and configured to luminesce in response to receiving an excitation light;
   a controller configured to selectively activate the port; and
   a light source disposed on the base member and configured to provide notification of a status of the port, wherein the light source illuminates in a first color when a non-authenticated electronic device is coupled to the port and a second color when an authenticated device is coupled to the port.

10. The external vehicle electrical connector of claim 9, further comprising:
    a proximity switch configured to detect a position of a cover, the cover configured to removably conceal the port.

11. An electrical connector, comprising:
    a base member and a port disposed within the base, the port configured to output electrical power;
    a cover configured to removably conceal the port;
    a proximity switch configured to detect a position of the cover; and
    a controller configured to selectively activate the port, wherein a vehicle notifies an occupant thereof when a vehicle sensor detects motion of the vehicle and an electronic device is coupled to the port.

12. The electrical connector of claim 11, further comprising:
    a luminescent structure on said electrical connector and configured to luminesce in response to receiving an excitation light.

13. The electrical connector of claim 11, further comprising:
    a light source disposed on the base member and configured to provide notification of a status of the port.

14. The electrical connector of claim 11, wherein the port is configured as a plurality of ports and a light source provides a status of each individual port.

* * * * *